United States Patent [19]

Schindl et al.

[11] Patent Number: 4,536,732
[45] Date of Patent: Aug. 20, 1985

[54] MAGNETIC COUPLING FOR PARTS OF AN OPTICAL INSTRUMENT

[75] Inventors: Klaus Schindl; Georg Nyman, both of Vienna, Austria

[73] Assignee: C. Reichert Optische Werke AG, Vienna, Austria

[21] Appl. No.: 612,156

[22] Filed: May 21, 1984

[30] Foreign Application Priority Data

May 28, 1983 [DE] Fed. Rep. of Germany ....... 3319466

[51] Int. Cl.³ .............................................. H01F 7/20
[52] U.S. Cl. .................................... 335/285; 335/288; 24/303
[58] Field of Search ............... 335/285, 288, 295, 306; 24/303

[56] References Cited

U.S. PATENT DOCUMENTS 2,678,228  5/1954  Gerhardt .......................... 24/303 X
3,108,346 10/1963  Bey ......................................... 24/303
3,177,546  4/1965  Bey ......................................... 24/303

Primary Examiner—George Harris
Attorney, Agent, or Firm—Alan H. Spencer; Stephen Raines

[57] ABSTRACT

A magnetic coupling comprises two parts of an optical instrument, for example, of a microscope, which are to be releasably coupled together. A locating surface is formed on one part, this surface comprising one or more areas defined by bodies composed of a magnetic material which are spaced apart at intervals, the other part comprising a locating surface comprising areas defined by bodies composed of a material which can be magnetized. In order to avoid mechanical shocks caused by a powerful magnetic attraction as the parts are coupled, the material which can be magnetized, and which is associated with one of the locating surfaces, is confined to one or more areas of this surface, the arrangement of these areas corresponding to that of the areas on the locating surface. Other parts of the locating surface are composed of a material which cannot be magnetized. The coupling operation is carried out, firstly, by offering up one of the parts in an opposed position in which position no magnetic attraction is effective. The two parts are rotated, relative to one another when they have contacted each other, thus effecting the overlapping of the magnetic areas with the areas which can be magnetized, and thereby effecting coupling.

9 Claims, 4 Drawing Figures

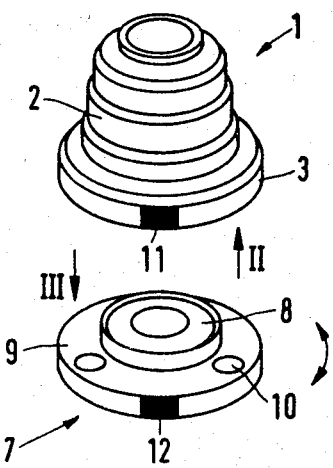
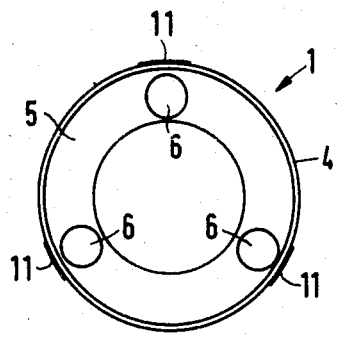 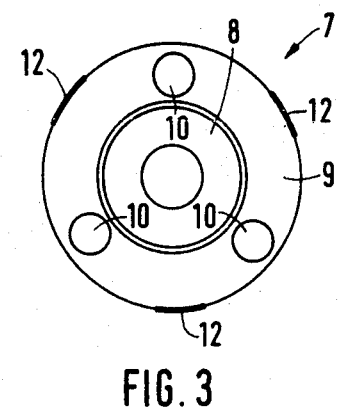
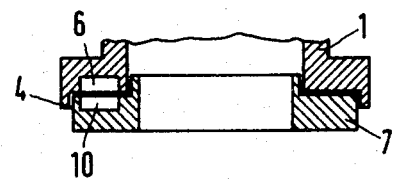

MAGNETIC COUPLING FOR PARTS OF AN OPTICAL INSTRUMENT

BACKGROUND OF THE INVENTION

This invention relates to a magnetic coupling comprising two parts of an optical instrument which can be realeasably coupled together. The invention is particularly suitable for a magnetic coupling in which the parts form components of a lens system of an optical instrument.

In addition to use in a lens system such as a condensor, magnetic couplings are suitable for light-guide couplings as well as for quick-change couplings on filters, lamps and objectives.

Known magnetic couplings comprise parts with mutually-opposed locating surfaces. The surface of one of the parts comprises one or more spaced-apart surfaces of a magnetic material, and the surface of the other part generally defines a non-magnetized material which can be magnetized.

In optical instruments such as cameras, bayonet couplings are very commonly used for connecting the lens to the body and for interconnecting lens parts. Magnetic couplings, of the type described above, are used in microscopes. One of a pair of parts of a microscope, for example, a condensor of the microscope, comprises a mounting with a ring-shaped locating surface. Three magnets are embedded in the surface at locations which are uniformly distributed about the periphery of the ring. The mounting is otherwise composed of a material which is non-magnetic, for example, aluminum. The other part of the microscope, which part can be, for example, an annular diaphragm for phase-contrast, a dark-field diaphragm, or an aperture diaphragm, comprises a mounting which has an opposed locating surface which is correspondingly ring-shaped for location against the surface of the first part, and is composed of a material which can be magnetized, for example, iron. When the parts are to be magnetically coupled, the second part can be offered up to the mounting of the first part with the locating surfaces facing one another and the second part in any rotational position relative to the first part. When the opposed locating surfaces come into contact with one another, the parts are firmly coupled due to magnetic attraction between the parts.

Magnetic couplings are advantageous over bayonet couplings in that magnetic couplings are easier to manufacture and to use. The user of a bayonet coupling needs to take note of a particular mounting position starting from which the parts of the bayonet coupling can be fitted into one another. A screwing-in action is then required for the parts to reach a locked-in position, which action requires a certain counter-holding force which can cause the optical instrument to go out of adjustment. Magnetic couplings dispense with these disadvantages.

However, known magnetic couplings are not free of disadvantages. Since the magnetic force increses rapidly as the distance between magnetic parts and the part which can be magnetized decreases, the parts to be coupled are, on being offered up to one another, strongly attracted shortly before the opposed locating surfaces come into contact. Mechanical shocks are caused by the surfaces striking one another, these mechanical shocks being capable of causing the instrument to go out of adjustment. Similarly, difficulties can be encountered when the coupled parts are to be separated.

OBJECT OF THE INVENTION

An object of the invention is to provide a magnetic coupling, of the type described, which enables parts to be coupled gently and without causing mechanical shocks while retaining the advantages of the known magnetic couplings.

BRIEF DESCRIPTION OF THE INVENTION

According to the present invention, we provide, in an optical instrument, a magnetic coupling comprising two parts, a first of the parts comprising one or more magnetized bodies, and a second of the parts comprising one or more magnetizable bodies, which parts are relatively movable between a first magnetically-coupled position in which bodies of the respective parts are adjacent to one another, and a second uncoupled position in which the respective bodies are displaced from one another, wherein the parts are movable between the first and second positions in a manner such that respective surfaces of the parts slide over one another.

Preferably, one or both of the magnetized and magnetizable bodies define areas of the respective surfaces of the first and second parts.

In a preferred embodiment of the magnetic coupling, in accordance with the invention, three magnetized bodies define three magnetized areas in an annular surface of the first part, these areas being uniformly distributed about the periphery of the annular surface. The second part suitably comprises a corresponding annular surface, the second part further comprising three magnetizable bodies which are not magnetized and which define three areas which are uniformly distributed about the periphery of the surface of the part. In the preferred embodiment, areas between the magnetizable areas are defined by a material which cannot be magnetized.

With the magnetic coupling, in accordance with the invention, it is possible to bring the two parts, which are to be coupled, together so that the parts are in a relative rotational position in which the parts are adjacent to one another and in which magnetized areas of one surface are positioned opposite those areas of the opposed surface which cannot be magnetized, so that there is no magnetic attraction, or only slight attraction, between the two parts. The two parts are then rotated relative to one another, with the surfaces in mutual contact until the magnetized areas overlap the areas which are magnetizable, so that the magnetic coupling becomes fully effective. Since the parts do not accelerate towards one another under magnetic force, heavy slamming together of the parts and resultant mechanical shocks, as described above, do not occur.

The magnetic coupling, in accordance with the invention, requires that the parts, which are to be coupled, are brought into proximity with one another in a defined relation, and are then rotated relative to one another, with the parts in mutual engagement until the magnetized areas overlap the magnetizable areas. The parts can be brought into proximity with one another in a plurality of relations since, in the preferred embodiment, a significantly greater proportion of the surface of the second part is defined by a magnetically "neutral" material than by the magnetizable areas. Provision can be made to identify a preferred offering-up defined relation by an indicating means in the form of a marking on one or both of the parts. Additionally, or alternatively, a stop or the like may be provided to restrict the parts against further relative movement when the parts are in the first position.

The number of magnetized and magnetizable areas need not necessarily be the same, provided that at least one pair of areas come to overlap each other when the parts are coupled. However, it is expedient to select matching numbers of areas on the respective surfaces for a more effective coupling.

The magnetized and magnetizable areas on the surfaces can be formed, in a known manner, by inserting bodies made of a material which can be, or are, magnetized into a matrix composed of a material which cannot be magnetized (for example, iron inserted into aluminum), or by inserting bodies made of a material which cannot be magnetized into a matrix composed of a material which can be magnetized (for example, aluminum inserted into iron).

The inserted bodies each comprise a surface which is flush with the surface of the material into which the bodies are inserted. The surfaces of the parts are machined to a smooth finish, in a conventional manner, in order to keep frictional adhesion between the two surfaces low while the parts are in contact with one another.

BRIEF DESCRIPTION OF THE DRAWINGS

In the text which follows, an illustrative embodiment of the invention is described in detail, by reference to the attached drawings:

FIG. 1 is a perspective representation of a condensor, and of an insert containing an annular diaphragm which is to be coupled to the condensor;

FIG. 2 is a plan view of a locating surface of the condensor viewed in the direction of the arrow II in FIG. 1;

FIG. 3 is a plan view of a locating surface of the annular diaphragm insert viewed in the direction of the arrow III in FIG. 1; and FIG. 4 is a partial diametral cross-section through both the condensor and the annular diaphragm insert with these components in a coupled state.

DETAILED DESCRIPTION OF THE INVENTION

A first part in the form of a magnetic coupling condensor 1, which is represented in FIG. 1, is a two-element condensor for a microscope, the latter not being shown. The condensor comprises a condensor tube-section 2 and a mounting 3, the mounting comprising a centering rim 4 (see FIG. 4). The mounting 3 is composed of a material which cannot be magnetized, such as aluminum, and comprises an annular-shaped planar-locating surface 5. Three permanently magnetized, or magnetic, bodies 6 are embedded in the mounting, being disposed at relative angular intervals of 120°. The bodies are embedded in a manner such that they lie flush in the locating surface 5. The magnetic bodies 6, accordingly, define magnetic areas of the locating surface 5.

FIG. 1 further shows a second part of the magnetic coupling in the form of an insert 7 which carries an annular diaphragm 8, which insert is to be coupled to the condensor 1. The insert 7 possesses a locating surface 9 which corresponds in shape and size to the locating surface 5, the insert being composed of a material which cannot be magnetized, such as aluminum. Three bodies 10, formed of a material which can be magnetized, such as iron, are embedded in the insert, the bodies being disposed at angular intervals of 120° relative to one another. The bodies are embedded in a manner such that they lie flush in the locating surface 9. The bodies 10 form areas of material which can be magnetized in the locating surface 9 which correspond to the magnetic areas of surface 5.

In a further embodiment of the magnetic coupling, not shown in the drawing, the bodies 10 are magnetized and are embedded in the insert 7, in orientations, such that the poles adjacent the surfaces 5 and 9 are of opposite polarity. By this means, the bodies 6 and 10 attract one another when the condensor 1 and insert 7 are magnetically coupled.

Markings 11 and 12 are made at angular intervals of 120° on a radially, outwardly-facing surface of the mounting 3, and on a radially, outwardly-facing surface of an outer rim of the insert 7. If, in order to be coupled to the condensor 1, the insert 7 is brought into proximity with the mounting 3, in a relative rotational position in which one of the markings 11 lines up, axially, with one of the markings 12, these two parts can be brought into engagement with one another with the locating surface 5 in contact with the surface 9. At this stage, there is virtually no magnetic attraction between the parts since the magnetic bodies 6 come to lie between the bodies 10 which can be magnetized. When the two surfaces are in mutual engagement, the insert 7 can be rotated in one of the two directions of rotation indicated by the double arrow in FIG. 1 so that the magnetic areas, defined by the bodies 6, come to overlap the areas defined by the bodies 10 which can be magnetized. The magnetic attraction between the parts is then at a maximum, and the parts are magnetically coupled. FIG. 4 shows the mounting 3 of the condensor and the insert in the magnetically coupled condition.

It can be seen from FIG. 4 that the insert is located inside a centering rim 4 of the mounting 3. The rim 4 assists the relative positioning of the parts.

A further embodiment of the magnetic coupling, not illustrated, comprises a stop which restrains the parts against further relative rotation in one direction, when the parts have been rotated from the position in which the areas 6 and 10 are not aligned to the position in which the areas are aligned.

We claim:

1. A magnetic coupling for an optical instrument comprising (1) a first member, at least one magnetized body in said first member; (2) a second member, at least one magnetizable body in said second member; said members being movable between a first magnetically uncoupled position in which bodies of the respective members are displaced from one another, and a second magnetically coupled position in which the bodies of the respective members are adjacent to one another; and (3) means for aligning the respective members in the first magnetically uncoupled position, wherein the members are movable between the first and second positions in a manner such that respective surfaces of the members slide over one another.

2. A magnetic coupling, in accordance with claim 1, wherein one or both of the magnetized and magnetizable bodies define areas of the respective surfaces of the first and second parts.

3. A magnetic coupling, in accordance with claim 1, wherein the parts are movable relatively rotationally between the first and second positions.

4. A magnetic coupling, in accordance with claim 3, wherein one or both of the surfaces are generally planar and annular in form.

5. A magnetic coupling, in accordance with claim 1, wherein the magnetizable bodies are not magnetized.

6. A magnetic coupling, in accordance with claim 1, wherein the magnetizable bodies are magnetized and are orientated so that, when the bodies of the respective parts are adjacent to one another, poles of opposite polarity face one another.

7. A magnetic coupling, in accordance with claim 1, wherein the parts each comprise a plurality of uniformly distributed bodies, each part comprising the same number of bodies.

8. A magnetic coupling, in accordance with claim 7, wherein the bodies of the respective parts are uniformly distributed in a circle.

9. A magnetic coupling, in accordance with claim 1, comprising an indicating means for indicating whether the parts are in the first or second position.

* * * * *